United States Patent
Boerema et al.

(10) Patent No.: US 10,309,520 B2
(45) Date of Patent: Jun. 4, 2019

(54) SNUBBER WITH SCOOP FEATURE FOR AUTOMOTIVE TRANSMISSION

(71) Applicant: Ford Global Technologies, LLC, Dearborn, MI (US)

(72) Inventors: Richard Simon Boerema, Northville, MI (US); Vijay Kumar Chimakurthy, Novi, MI (US); Mark Steward, Ann Arbor, MI (US); Dengfu Zhang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 15/435,749

(22) Filed: Feb. 17, 2017

(65) Prior Publication Data

US 2018/0238435 A1 Aug. 23, 2018

(51) Int. Cl.
*F16H 7/02* (2006.01)
*F16H 7/18* (2006.01)
*F16H 57/04* (2010.01)

(52) U.S. Cl.
CPC ........... *F16H 57/0423* (2013.01); *F16H 7/02* (2013.01); *F16H 7/18* (2013.01); *F16H 57/0457* (2013.01); *F16H 57/0489* (2013.01); *F16H 2007/185* (2013.01)

(58) Field of Classification Search
CPC ........ F16H 7/18; F16H 57/0423; F16H 57/05; F16H 2007/0872; Y10T 74/2186
USPC .................................................. 474/140, 91
See application file for complete search history.

(56) References Cited

U.S. PATENT DOCUMENTS

| | | | | |
|---|---|---|---|---|
| 1,161,724 A | * | 11/1915 | Pierce | F16H 57/0421 184/11.1 |
| 1,771,346 A | * | 7/1930 | Perry | F16H 57/0456 184/15.1 |
| 1,771,835 A | * | 7/1930 | Bartlett | F16H 57/05 184/13.1 |
| 1,960,693 A | * | 5/1934 | Bryant | F16H 57/0421 184/13.1 |
| 2,355,003 A | * | 8/1944 | McCann | B62J 31/00 184/16 |
| 2,601,789 A | * | 7/1952 | Riopelle | F16H 7/18 474/140 |
| 2,718,153 A | * | 9/1955 | Dean | F16H 7/06 198/837 |
| 2,766,634 A | * | 10/1956 | Frank | F16F 7/00 474/140 |

(Continued)

*Primary Examiner* — Henry Y Liu
(74) *Attorney, Agent, or Firm* — David Kelley; Brooks Kushman P.C.

(57) ABSTRACT

A snubber for an automotive transmission includes a generally flat surface configured to limit radially-outward movement of a drive member that transfers torque from a transmission gearbox output to a differential input. A mouth of the snubber is fluidly coupled to an internal cavity that capturing transmission fluid as the fluid is moved around due to movement of the drive member. A wing of the snubber extends from the generally flat surface toward the drive member. The wing has a hollow interior fluidly coupled to the internal cavity. A concave outer surface is located outside of and adjacent to the mouth. The concave surface deflects a portion of the fluid, preventing that portion from entering the mouth. This increases the flow of fluid away from the drive member which can lead to drag.

20 Claims, 2 Drawing Sheets

(56) References Cited

U.S. PATENT DOCUMENTS

| | | | | |
|---|---|---|---|---|
| 3,012,632 | A * | 12/1961 | Bradley | B62J 31/00 184/15.1 |
| 3,529,698 | A * | 9/1970 | Nelson | B61C 17/08 184/11.2 |
| 4,693,133 | A * | 9/1987 | Tomita | F16H 57/0006 184/6.12 |
| 5,257,962 | A * | 11/1993 | Martin | B60K 17/00 180/378 |
| 5,273,136 | A * | 12/1993 | Martin | F16H 57/0421 184/6.12 |
| 5,647,811 | A * | 7/1997 | Mott | F16H 7/08 184/16 |
| 5,720,682 | A * | 2/1998 | Tada | F01M 9/108 184/15.1 |
| 5,800,299 | A * | 9/1998 | Lamers | F16H 57/0421 474/45 |
| 5,868,638 | A * | 2/1999 | Inoue | F16H 7/0848 474/101 |
| 5,989,138 | A * | 11/1999 | Capucci | F16H 7/08 474/109 |
| 6,000,373 | A * | 12/1999 | Woodhouse | F01M 1/02 123/196 M |
| 6,238,312 | B1 * | 5/2001 | Tsubata | F16H 37/021 474/144 |
| 6,440,020 | B1 * | 8/2002 | Tada | F16H 7/08 474/111 |
| 6,447,416 | B1 * | 9/2002 | Jacques | F16H 7/08 474/111 |
| 6,554,728 | B2 * | 4/2003 | Young, Jr. | B62J 13/00 474/140 |
| 7,712,581 | B2 * | 5/2010 | Billings | F16H 57/0489 184/13.1 |
| 7,942,769 | B2 * | 5/2011 | Pflug | F16H 7/18 474/111 |
| 7,984,791 | B2 * | 7/2011 | Taguchi | F16H 57/0483 184/11.1 |
| 8,387,244 | B2 * | 3/2013 | Markley | F01L 1/022 123/90.31 |
| 8,573,362 | B2 * | 11/2013 | Nagele | B62J 31/00 184/15.1 |
| 8,657,073 | B2 * | 2/2014 | Matsumoto | F16H 57/0483 184/11.1 |
| 8,672,094 | B2 * | 3/2014 | Quehenberger | F16H 57/0419 184/6.12 |
| 8,696,500 | B2 * | 4/2014 | Hirayama | F16H 7/18 184/11.5 |
| 8,701,837 | B2 * | 4/2014 | Yamamoto | F16H 7/06 184/11.1 |
| 8,739,930 | B2 * | 6/2014 | Bonning | F16H 57/0436 184/6.12 |
| 8,875,841 | B2 * | 11/2014 | Yoshimi | F16H 3/006 184/6.12 |
| 8,919,500 | B1 * | 12/2014 | Kilcrease | F01M 9/06 184/11.5 |
| 9,046,166 | B2 * | 6/2015 | Neumeister | F16H 57/0409 |
| 9,631,715 | B1 * | 4/2017 | Steward | F16H 57/0423 |
| 9,638,313 | B2 * | 5/2017 | Steward | F16H 57/0423 |
| 2002/0042316 | A1 * | 4/2002 | Young, Jr. | B62J 13/00 474/140 |
| 2004/0142792 | A1 * | 7/2004 | Glas | F16H 59/36 477/70 |
| 2006/0054407 | A1 * | 3/2006 | Wirth | F16H 57/05 184/6.12 |
| 2006/0065487 | A1 * | 3/2006 | Tominaga | F16H 57/0406 184/6.12 |
| 2006/0100047 | A1 * | 5/2006 | Churchill | F16H 7/18 474/109 |
| 2006/0179973 | A1 * | 8/2006 | Matsufuji | F16H 57/0447 74/606 R |
| 2009/0325748 | A1 * | 12/2009 | Pflug | F16H 7/18 474/91 |
| 2011/0244999 | A1 * | 10/2011 | Nakamura | F16H 9/18 474/91 |
| 2011/0250999 | A1 * | 10/2011 | Nagele; Michael | B62J 31/00 474/91 |
| 2013/0109517 | A1 * | 5/2013 | Tiernan | F16H 57/05 474/91 |
| 2014/0053680 | A1 * | 2/2014 | Wakeman | F16C 3/14 74/604 |
| 2015/0204437 | A1 * | 7/2015 | Utaki | F16H 7/18 474/91 |
| 2017/0108111 | A1 * | 4/2017 | Steward | F16H 57/0423 |

* cited by examiner

SNUBBER WITH SCOOP FEATURE FOR AUTOMOTIVE TRANSMISSION

TECHNICAL FIELD

This disclosure relates to a snubber for a chain in an automotive transmission, in which the snubber includes a scooped mouth to receive and deflect transmission fluid.

BACKGROUND

Conventional and hybrid vehicles alike typically require a transmission to provide speed and torque conversions from the engine to another device such as a differential, for example. Lubricating fluid or oil is necessary to reduce adverse side effects of friction and maintain operability of the moving parts within the transmission. The fluid circulates throughout the transmission via a pump and collects in a pan or sump at the bottom of the transmission housing.

In a typical transmission, a drive member such as a chain transfers torque from an output shaft to a differential, where the torque is distributed to the wheels of the vehicle. The drive member operates while being lubricated by a transmission fluid. A baffle can surround the drive member to provide sealing functions while containing a portion of the fluid. A snubber can be placed along a section of the chain to limit unwanted movement of the chain.

SUMMARY

According to one embodiment, a vehicle includes a transmission gearbox output and a differential input. A drive member is configured to transfer torque from the output to the input. A snubber has a surface configured to contact the drive member during rotation of the drive member. The snubber also has a mouth leading to an internal cavity for capturing transmission fluid, and a concave surface outside and adjacent to the mouth and configured to deflect fluid away from the snubber.

According to another embodiment, a snubber for an automotive transmission includes a surface defining an open mouth and an internal cavity for capturing transmission fluid, and a concave surface outside of the cavity and adjacent the mouth configured to deflect fluid away from the snubber.

The snubber can also have a generally flat surface configured to contact and limit radially-outward movement of a drive member connecting a transmission gearbox output to a differential input. The snubber can have a wing having an outer surface continuous with the generally flat surface and extending radially inward past the drive member. The wing can define a hollow interior in fluid communication with the internal cavity.

In yet another embodiment, a snubber for an automotive transmission includes a generally flat surface configured to limit radially-outward movement of a drive member connecting a transmission output to a differential input. A mouth of the snubber is fluidly coupled to an internal cavity for capturing transmission fluid. A wing of the snubber extends from the generally flat surface toward the drive member, the wing has a hollow interior fluidly coupled to the internal cavity, the wing defines an outlet to dispense the transmission fluid radially inward from the drive member. A concave outer surface is located outside of and adjacent to the mouth.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIGS. 1-4 described below illustrate a snubber located in a transmission, partially covering a drive member (e.g., belt, chain, etc.) that transmits power from an output of a transmission gearbox to an input of a differential. The differential splits and transmits the force to wheels of the vehicle. The components shown in the figures can be located between a transmission housing and a differential housing that mount to one another within a vehicle. Lubricating fluid (also referred to as fluid, transmission fluid, or oil) circulates through the gearbox and differential of the transmission and drains into a transmission sump. The snubber limits outward (radial) movement of the drive member. As will be described below, the snubber also has an integrated scoop feature with an internal cavity that collects some of the transmission fluid and distributes the fluid at particular locations. While the context of the disclosure below regarding the snubber is particularly focused with application in a vehicle transmission, it should be understood that the features of the transmission drive assembly may be implemented in any context in a vehicle in which a drive member circulates fluid.

Figure 1:
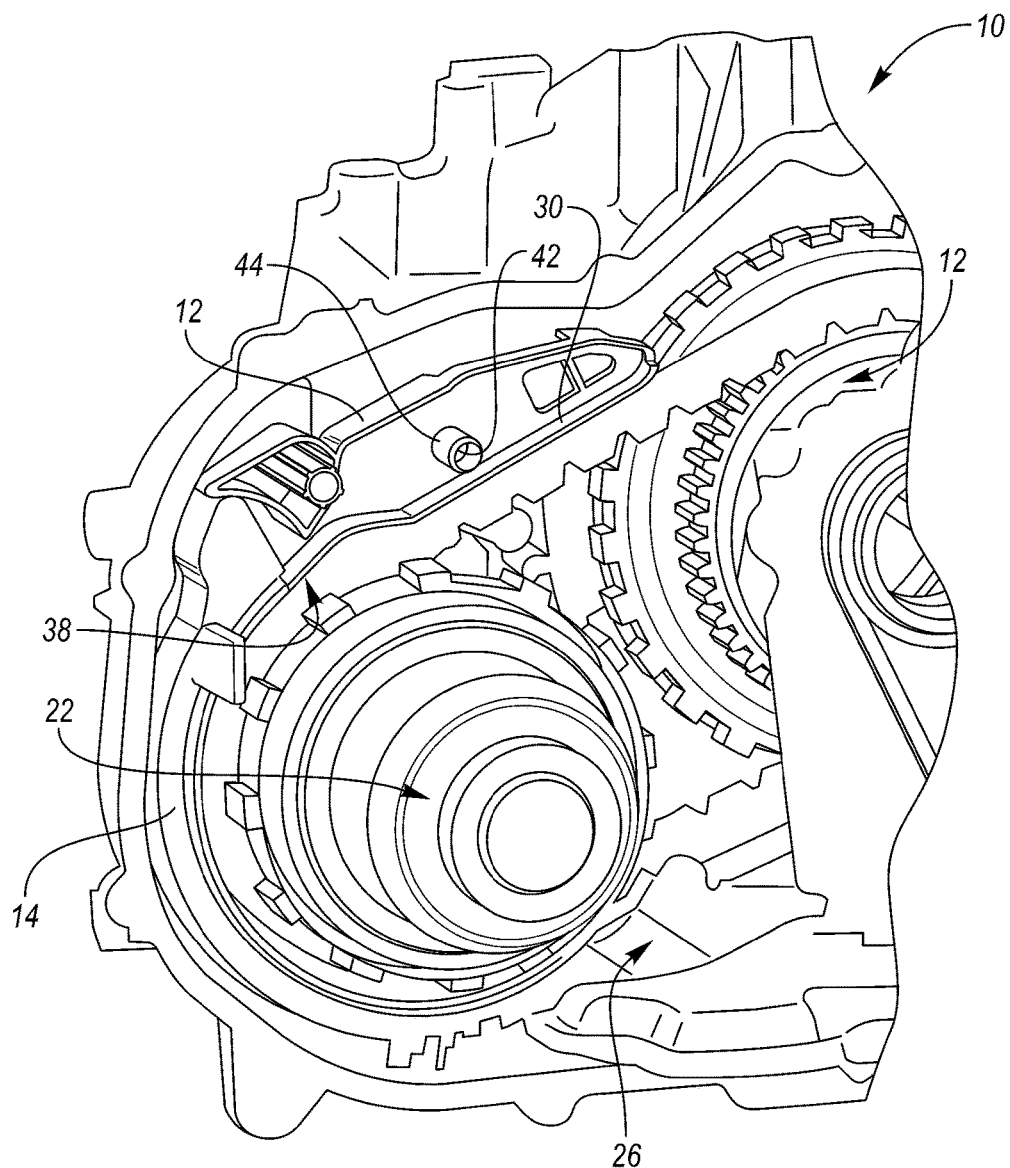
FIG. 1 is a perspective view of an assembly that transfers torque from a transmission to a differential, according to one embodiment.

FIGS. 1 illustrates a transmission drive assembly 10 that transmits torque from a transmission to a differential. The assembly 10 includes a snubber 12 with an integrated scoop feature, which will be described in more detail below. The assembly 10 also includes a baffle 14, which can be a one-piece or two-piece baffle assembly. The baffle 14 partially surrounds and sheathes a torque transfer member, or drive member 18. The drive member 18 transfers rotational power from an output of a transmission gearbox (not shown) to an input 20 of a differential 22. The drive member 18 can be a chain that interacts with teeth on the differential input. In another embodiment, the drive member 18 is a belt.

The drive member 18 operates in lubricating fluid, for example, transmission fluid that exits the transmission gearbox. The fluid can collect within a baffle sump 26 which can collect fluid at a low point. Collected fluid in the baffle's sump can cause splashing or aeration of the lubricating fluid in the baffle sump. In particular, when the sump is flooded or includes standing lubricating fluid therein, the fluid can be propelled throughout the transmission, between the transmission housing and differential housing. This can cause excess circulation of the fluid and exposure of the fluid and the components within the transmission. Additionally, collected fluid in the baffle sump can place unnecessary and unwanted drag on the drive member 18. Moreover, if the drive member 18 is permitted to bow or bend outwardly with little control, the fluid can be splashed or sprayed in unwanted patterns or directions.

Accordingly, various embodiments of this disclosure provide a snubber 12 placed along the travel path of the drive member 18. The snubber 12 is located radially outward form the drive member 18 and has a smooth contact surface 30 for limiting outwardly movement of the drive member 18. This minimizes the opportunity for the drive member 18 to bow outwardly, which could cause the transmission fluid to spray about the surrounding structure in unpredictable manners. As will be described below, the snubber has an integrated scoop feature 32 that aids in the deflection of the transmission fluid.

Figure 2:
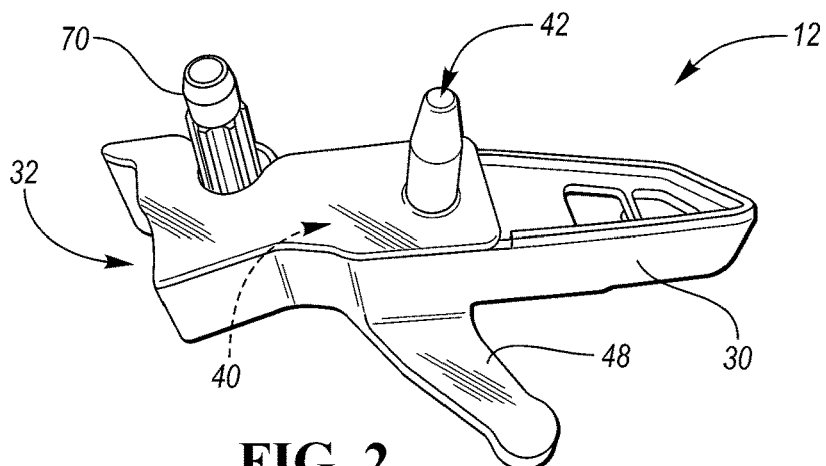
FIG. 2 is a side view of one side of a snubber that is part of the assembly of FIG. 1, according to one embodiment.
Figure 3:
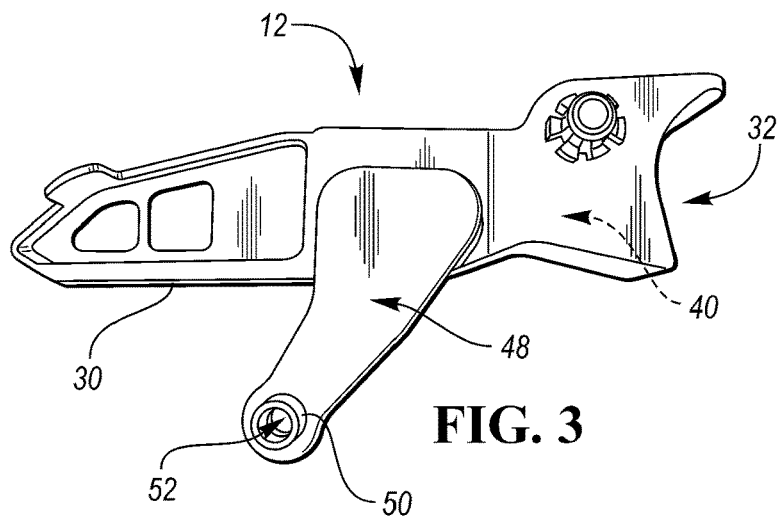
FIG. 3 is a side view of another side of the snubber, according to one embodiment.
Figure 4:
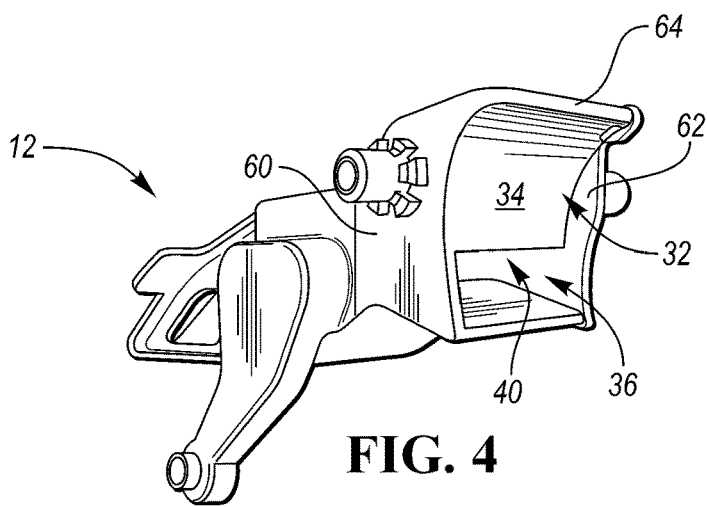
FIG. 4 is a front perspective view of the snubber showing a concave surface and a mouth leading to a hollow interior of the snubber, according to one embodiment.

FIGS. 2-4 show the snubber 12 in isolation. The contact surface 30 is shown, which, when assembled to the assembly 10, provides a smooth surface to bias the drive member 18 inward, or inhibit outward movement of the drive member 18. The snubber 12 also includes an integrated scoop feature 32. The scoop feature 32 includes a concave surface 34 above (radially outward) from an opening or mouth 36.

As shown in FIG. 1, the concave surface 34 and mouth 36 are spaced apart from the end of the baffle 14 by a gap 38. This gap 38 allows some oil transmitted about the differential 22 by the drive member 18 to be removed from the path of rotation of the drive member 18. This reduces fluid buildup in the baffle sump, which can cause drag on the drive member 18. If too much oil is allowed to accumulate in the gap and between the baffle 14 and snubber 12, the transmission fluid cannot be properly removed from the pathway of the drive member 18 and drag can again be placed on the drive member 18. Therefore, the snubber 12 is provided with the integrated scoop feature and concave surface 34 which facilitates removal of the transmission fluid from the path of the drive member 18, and allows the fluid to return to the sump of the assembly 10.

The concave surface 34 is concave inward into the direction of the snubber 12. The concave surface 34 faces the end of the baffle 14 which can include a hollow opening. In operation, the drive member 18 travels about the differential 22 (in a clockwise direction, from the orientation of FIG. 1). During this travel, transmission fluid is brought up with the drive member 18, and around the differential 22, contained within the baffle 14. Some of this fluid is scraped off from the baffle 14 itself. Some of the fluid enters into the gap 38 between the baffle 14 and the snubber 12. Once the fluid enters into this gap 38, some of that fluid hits the concave surface 34 and is directed back to the outside of the baffle 14, where the fluid can fall to the transmission sump or the baffle sump. Some of that fluid that has entered into the gap 38 is directed into a cavity within the snubber 12, as described below.

The snubber 12 has a mouth 36 located below (radially inward) from the concave surface 34. The mouth 36 leads into an interior cavity or chamber 40 within the snubber 12. In other words, the snubber 12 is at least partially hollow with a hollow chamber 40 that collects some of the transmission fluid. Once inside the chamber 40 of the snubber 12, the fluid can be distributed out of the snubber 12 at one or more distinct, fixed locations. For example, the snubber 12 can be provided with a first opening 42 at an end of a first hollow projection 44 that extends from a sidewall of the snubber 12. The first hollow projection 44 is in fluid communication with the chamber 40, and is configured to directs fluid away from the chamber 40 to exit out of the opening 42 at a point within the assembly 10 that is laterally removed from the drive member 18. In other words, the fluid is removed from the snubber 12 at a first fluid outlet such that it will not interfere with the rotation of the drive member 18.

The snubber can also be provided with a wing 48 extending from one side of the snubber 12. The wing 48 extends radially inward toward the differential 22. The wing 48 is also hollow and in fluid communication with the chamber 40. A side surface of the wing 48 includes a second projection 50 extending therefrom. The second projection 50 ends at second opening 52 that serves as a second fluid outlet from the chamber 40. The projection 50 and opening 52 are configured to direct fluid away from the chamber 40 at a point within the assembly 10 that is laterally removed from the drive member 18.

In one embodiment, the first opening 42 is located such that fluid exiting the first opening 42 exits at a point outside of the baffle 14 such that the fluid returns to a transmission sump, while fluid exiting the second opening 52 exits at a point generally contained within the baffle 14 such that the fluid returns to the baffle sump 26. Fluid returned to the baffle sump 26 can contact the drive member 18 directly and immediately, while fluid returned outside of the baffle and to the transmission sump must travel back inside the baffle before it is able to contact the drive member 18.

In one embodiment, the concave surface 34 extends entirely between two side surfaces 60, 62 of the snubber 12. The concave surface 34 may be a single, continuous, concave surface that is the only surface between the mouth 36 and a top 64 of the snubber 12. In one embodiment not shown, one or both of the side surfaces 60, 62 does not extend beyond the concave surface 34 such that no amount of fluid that hits the concave surface 34 does so while being between two side surface. In other words, all of the fluid that hits the concave surface 34 is not constrained or bound laterally on both sides of the snubber 12 by the snubber 12 itself.

In one embodiment, the concave surface 34 defines a linear height that exceeds that of the mouth 36. The concave surface 34 may also have an arc length (curved length of the concave surface from one end to another) that exceeds the height of the mouth 36.

The snubber 12 can also be provided with a mounting projection 70 with a hollow interior that is not in fluid communication with the chamber 40. This mounting projection has an aperture configured to receive a corresponding fastener to fasten the snubber 12 to the transmission housing.

Utilizing the snubber with the integrated scoop design in this embodiment helps to remove oil from the travel path of the drive member 18 at a particular point along the travel path. The removal of the oil reduces the turbulence in the oil, which improves the operation of the drive member 18 with less drag.

The baffle may have a scoop feature to collect accumulated fluid in the baffle sump and redirect the fluid into different areas of the transmission, such as the transmission sump. These features, along with other surrounding structural features, are disclosed in U.S. application Ser. No. 1,543,703, which is filed on the same day as this disclosure, and which is incorporated by reference herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
 a transmission gearbox output;
 a differential input;
 a drive member configured to transfer torque from the output to the input; and
 a snubber having a surface configured to contact the drive member during rotation of the drive member, the snubber having
  a mouth leading to an internal cavity for capturing transmission fluid, and
  a concave surface outside and adjacent to the mouth and configured to deflect fluid away from the snubber.

2. The vehicle of claim 1, wherein the surface is generally flat and is configured to limit radially-outward movement of the drive member.

3. The vehicle of claim 1, wherein the snubber further includes a wing extending from the surface and radially inward of the drive member, the wing defining a hollow chamber in fluid communication with the internal cavity.

4. The vehicle of claim 3, wherein the wing has an end radially inward from the drive member, the end defining an outlet for dispensing the transmission fluid.

5. The vehicle of claim 1, wherein the concave surface has a height that exceeds a height of the mouth.

6. The vehicle of claim 1, wherein the concave surface has an arc length that exceeds a height of the mouth.

7. A snubber for an automotive transmission, comprising:
 a surface defining an open mouth and an internal cavity for capturing transmission fluid; and
 a concave surface outside of the cavity and adjacent the mouth configured to deflect fluid away from the snubber.

8. The snubber of claim 7, further comprising a generally flat surface configured to contact and limit radially-outward movement of a drive member connecting a transmission gearbox output to a differential input.

9. The snubber of claim 8, further comprising a wing having an outer surface continuous with the generally flat surface and extending radially inward past the drive member.

10. The snubber of claim 9, wherein the wing defines a hollow interior in fluid communication with the internal cavity.

11. The snubber of claim 9, wherein the wing defines an outlet at one end configured to dispense the transmission fluid radially inward from the drive member.

12. The snubber of claim 7, wherein the concave surface has a height that exceeds a height of the open mouth.

13. The snubber of claim 7, wherein the concave surface has an arc length that exceeds a height of the open mouth.

14. The snubber of claim 7, wherein the snubber has two opposing outer side surfaces, and the concave surface extends completely between the two opposing outer side surfaces.

15. A snubber for an automotive transmission, comprising:
 a generally flat surface configured to limit radially-outward movement of a drive member connecting a transmission gearbox output to a differential input;
 a mouth fluidly coupled to an internal cavity for capturing transmission fluid;
 a wing extending from the generally flat surface toward the drive member, the wing having a hollow interior fluidly coupled to the internal cavity, the wing defining an outlet to dispense the transmission fluid radially inward from the drive member; and
 a concave outer surface located outside of and adjacent to the mouth.

16. The snubber of claim 15, wherein the concave outer surface is located further from the generally flat surface than the mouth.

17. The snubber of claim 15, wherein the concave outer surface has a height that exceeds a height of the mouth.

18. The snubber of claim 15, wherein the concave outer surface has an arc length that exceeds a height of the mouth.

19. The snubber of claim 15, further comprising a pair of opposing side surfaces, wherein the concave outer surface extends laterally and entirely between the side surfaces.

20. The snubber of claim 15, wherein the snubber includes an outer perimeter and the concave outer surface is disposed on the outer perimeter.

* * * * *